UNITED STATES PATENT OFFICE.

ADOLF BAEYER, OF MUNICH, BAVARIA, ASSIGNOR TO BADISCHE ANILIN AND SODA FABRIK, OF MANNHEIM, GERMANY.

PROCESS OF MANUFACTURE OF INDIGO-BLUE.

SPECIFICATION forming part of Letters Patent No. 259,261, dated June 6, 1882.

Application filed May 8, 1882. (No specimens.)

*To all whom it may concern:*

Be it known that I, ADOLF BAEYER, a subject of the King of Bavaria, residing at Munich, in the Kingdom of Bavaria and German Empire, have invented new and useful Improvements in the Manufacture of Artificial Indigo-Blue, of which the following is a specification.

This invention relates to the manufacture of an artificial indigo-blue from orthonitrophenylpropiolic acid by first converting said orthonitrophenylpropiolic acid into an ether compound—such as its ethylic ether—then converting this ether compound into indogenic ether, then treating such indogenic ether with caustic alkalies followed by muriatic acid, then converting the indogenic acid resulting from the foregoing operations into indogen, and finally exposing this indogen to an oxidizing action.

In carrying out my invention I take an ether compound of orthonitrophenylpropiolic acid—such, for instance, as the ethylic ether of the said acid—and I treat the same with a cold solution of an ammonium sulph-hydrate until no further reaction is observed to take place, or until a sample of the insoluble portion of the product ceases to dissolve in concentrated sulphuric acid with an orange-red color. I then add a slight excess of muriatic acid, by which a precipitate is produced. This precipitate is filtered and washed, and then exhausted by repeated treatment with a cold and dilute solution of caustic soda. The alkaline extract thus obtained is acidified with muriatic acid, whereby indogenic ether is precipitated. In order to convert the said indogenic ether into indogenic acid I treat the former with hot and concentrated caustic alkalies, in which treatment I proceed as follows: I take from three to five parts, by weight, of caustic soda and add so much water that the mixture has a fusing point of 160° to 180° centigrade. To this mixture I gradually add one part, by weight, of indogenic ether and keep the whole mass at a temperature of from 160° to 180° centigrade, stirring it well all the time until the fusing process is completed or until no longer alcoholic vapors are evolved. I then allow the mass to cool, and introduce the same, in small portions at a time, into an excess of cold muriatic acid. In this manner a precipitate of indogenic acid is obtained, which may be collected on a filter, washed, and dried. I then convert the indogenic acid thus prepared into indogen by the action of heat upon the said acid, either in its dry state or in the presence of water or any other solvent. For instance, indogenic acid is carefully heated up to about 122° centigrade, when the acid first fuses and then decomposes into carbonic acid and indogen, the former escaping into the air, the latter remaining in the shape of an oily liquid. By exposing indogen to an oxidizing action it becomes converted into artificial indigo-blue. For this purpose the indogen may be dissolved in an alkaline solution and then exposed to the action of the atmospheric air; or it may be treated with acid oxidizers, such as acid solutions of the perchlorides of iron or copper or of bichromate of potash.

What I claim as new, and desire to secure by Letters Patent, is—

The within-described process of producing an artificial indigo-blue by first producing an ether compound of orthonitrophenylpropiolic acid, then converting this ether compound into indogenic ether, then converting such indogenic ether into indogenic acid by treatment with caustic alkalies followed by muriatic acid, then transforming the indogenic acid into indogen by the action of heat, and finally exposing the indogen to an oxidizing action, substantially as set forth.

In testimony whereof I have hereunto set my hand and seal in the presence of two subscribing witnesses.

ADOLF BAEYER.

Witnesses:
LUDWIG LUNDBURG,
ADOLF SPIEGEL.